United States Patent [19]

Cycon et al.

[11] Patent Number: 5,048,652
[45] Date of Patent: Sep. 17, 1991

[54] PROGRESSIVE ENGAGEMENT CLUTCH

[75] Inventors: James P. Cycon, Orange; Vincent F. Millea, Stratford; Peter G. Sanders, Waterbury, all of Conn.

[73] Assignee: United Technologies Corporation, Hartford, Conn.

[21] Appl. No.: 440,824

[22] Filed: Nov. 24, 1989

[51] Int. Cl.[5] .................. F16D 11/00; F16D 23/02; F16D 43/04
[52] U.S. Cl. ................. 192/48.4; 192/48.6; 192/53 R; 192/53 B; 192/67 P; 192/105 R; 192/105 CD; 192/114 R
[58] Field of Search ............ 192/48.4, 48.6, 53 R, 192/53 B, 105 CP, 67 P, 48.3, 53 A, 105 CD, 114 R, 105 R

[56] References Cited

U.S. PATENT DOCUMENTS

| | | | |
|---|---|---|---|
| 1,257,718 | 2/1918 | Lott | 192/53 A |
| 1,509,469 | 9/1924 | Brink | 192/53 A |
| 1,851,146 | 3/1932 | Banker | 192/53 B |
| 2,068,123 | 1/1951 | Elliott | 192/53 B |
| 2,497,893 | 2/1950 | Linahan | 192/114 R |
| 4,821,859 | 4/1989 | Suchdev et al. | 192/105 C,D |

FOREIGN PATENT DOCUMENTS

| | | | |
|---|---|---|---|
| 674934 | 4/1939 | Fed. Rep. of Germany | 192/53 A |
| 217708 | 6/1924 | United Kingdom | 192/53 R |

*Primary Examiner*—Rodney H. Bonck

[57] ABSTRACT

A progressive clutch includes a centrifugal clutch 10 attached to a drive shaft and inserted into a clutch housing assembly 16 to engage with clutch material 28 during low rpm operation. As the rpm of the input drive shaft 2 increases, the centrifugal force on pellets 32 overcomes the force of compression springs 34, and extension springs 40 pull a pin engagement assembly 30 towards the clutch housing assembly 16 thus engaging pins 38 into elongated holes 42 to provide positive drive from the drive shaft 2 to the driven shaft 21.

5 Claims, 2 Drawing Sheets

PROGRESSIVE ENGAGEMENT CLUTCH

DESCRIPTION

1. Technical Field

This invention relates to clutches and more particularly a lightweight progressive engagement clutch which can transfer high torque over a wide RPM range.

2. Background Art

The clutches used in helicopters to engage the engine to the rotor have traditionally been large, heavy clutches due to the wide rpm operating range and tremendous torques they must transfer. The clutch is required to transfer not only a smooth and gradual increasing torque schedule while the rotor accelerates from zero rpm to engine idle speed, but also enough torque for the tremendous rotor loads encountered during high speed flight manuevers. Previously, clutch size and weight has not been of critical concern because of the insignificance when compared with that of the total aircraft and payload.

Recently, technological advances in the engineering sciences have provided the feasibility of using Remote Piloted Vehicles (RPV), particularly unmanned rotary aircraft, for military purposes. These aircraft are just a fraction of the size of traditional helicopters, but they still must be able to carry useful payloads. The development of these small, lightweight RPV's has fostered the need for lighter, more compact engine drive trains to provide engine power to the rotor. One of the critical components affecting the operable size of the drive train is the clutch assembly. Traditional centrifugal clutches are inadequate for RPV application because their size and weight is disproportionate with the rest of the aircraft.

Clutch designs having multiple mechanisms for transferring torque according to differing, sequential schedules (referred to hereinafter as progressive engagement clutches) provide a viable alternative to using centrifugal clutches in RPV's. U.S. Pat. Nos. 1,350,965 (Higginbotham) and 1,423,631 (Skaife) disclose examples of progressive engagement clutches. In both systems, a drive member is initially forced into a driven member to engage a secondary torque path through a clutch mechanism utilizing springs to create friction between the drive and driven members. After a period of time, the drive member is forced further into the driven member to engage a positive drive, primary torque path through a gear or pin mechanism. Both of these clutch systems are unsuitable for RPV application, however, because they require an external control force to progressively push the drive member into the driven driven member at the transition between primary and secondary torque paths. RPV clutches should be self-controlled systems and avoid the additional size and weight required for external controls.

DISCLOSURE OF THE INVENTION

An object of the present invention is to provide an improved progressive engagement clutch which can transfer high torque at both low and high RPM.

Another object is to provide an improved progressive engagement clutch which is small and light-weight.

According to the present invention, a progressive engagement clutch utilizes a centrifugal clutch to transfer torque from the drive member to the driven member until the drive member attains a critical speed at which time a pin engagement assembly attached to the drive member engages pins into receptive slots in the driven member to provide positive drive thereto.

The foregoing and other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
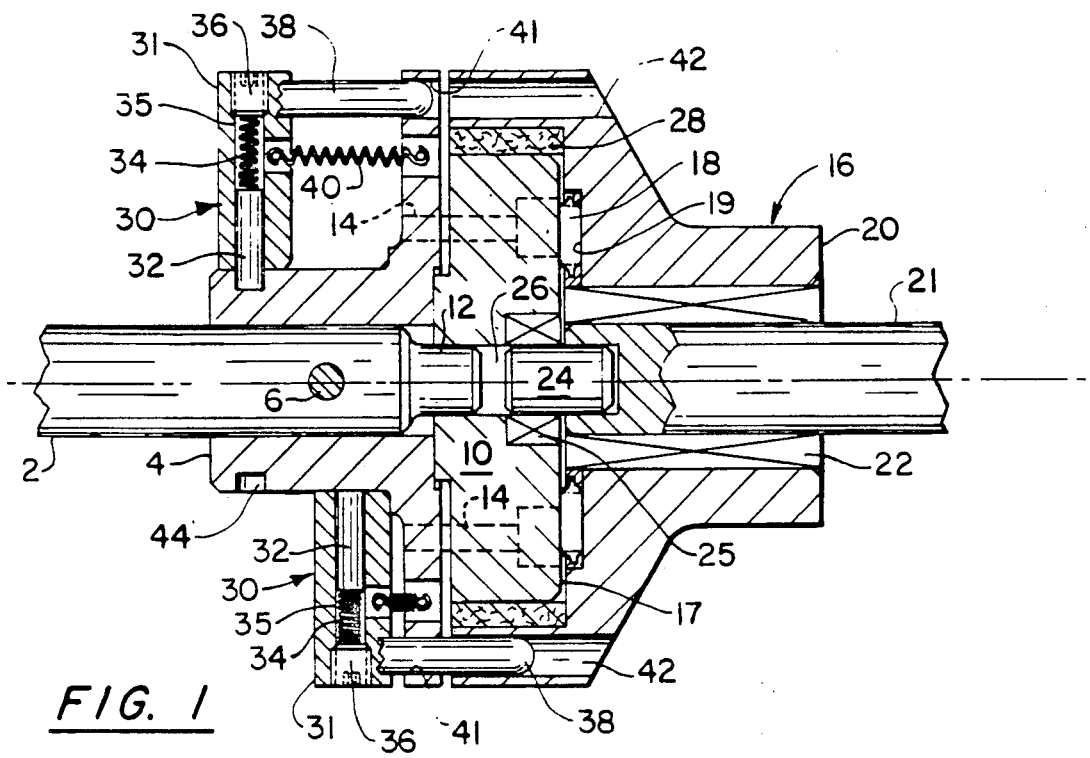
FIG. 1 is an axial, cross-sectional view of the present invention.

Referring now to FIG. 1 an input drive shaft 2 is disposed within a clutch hub 4 and is fixably attached thereto by a dowel pin 6. A centrifugal clutch 10 engages with a neck 12 on an end of drive shaft 2 and is mounted to the face of clutch hub 4 by two socket head cap screws 14. The centrifugal clutch 10 is disposed within clutch housing assembly 16 with the face 17 of the clutch engaging a bearing 18 (such as Torrington model type FNT), which is disposed within an annular slot 19 in clutch housing 20. A driven shaft 21 is disposed within an overrunning clutch 22 (such as Torrington model type FCB) which is secured in clutch housing 20. An alignment pin 24 is partly fixably disposed within a foramen in driven shaft 21 and engages with a roller bearing 25 which is mounted within a center hole 26 through centrifugal clutch 10. The overrunning clutch 22 permits torque from drive shaft 2 to be transmitted from the drive shaft 2 to the driven shaft 21 in only one direction of rotation. In the helicopter application, the overrunning clutch 22 allows autorotation to occur. Autorotation is a condition in which the helicopter rotor speed exceeds the engine output speed. During autorotation, the rotor freewheels and must not transfer torque back to the engine.

Centrifugal clutch 10 engages with a clutch material 28 as the input drive shaft 2 increases in rpm.

A pin engagement assembly 30 is shown in both an unengaged state and an engaged state with the top half of the drawing being the unengaged state and the bottom half of the drawing being the engaged state. Pin engagement assembly 30 includes a housing 31 which encloses a pair of pellets 32 (180° apart) acted upon by compression springs 34 which are held in place within a bore 35 by set screws 36. Six engagement pins 38 (60° apart) are fixably attached to housing 30. Four extension springs 40 (90° apart) fixably attached at one end to housing 31 and at the other end to clutch hub 4, draw the pin engagement assembly 30 toward the clutch housing assembly 16 so that engagement pins 38 protrude through holes 41 in clutch hub 4 and slideably engage with elongated holes 42 (FIG. 2) in the clutch housing 20.

In the resting state, in which the drive shaft 2 is not engaged with the driven shaft 21, the pellets 32 rest in detents 44 in clutch hub 4 to prevent extension springs 40 from pulling the pin engagement assembly 30 toward the clutch housing assembly 16. As the drive shaft 2 accelerates, the centrifugal force acting on centrifugal clutch 10 increases until it engages with clutch material 28. Torque is subsequently transmitted from drive shaft 2 to the driven shaft 21 and the rotor blades (or other loads) begin to turn. As the drive shaft 2 continues to accelerate, increasing torque is transmitted from drive shaft 2 to the driven shaft 21, (due to the action of centrifugal clutch 10), and the driven shaft continues to accelerate. Eventually the drive shaft RPM magnitude will be such that the centrifugal force acting on the pellets 32 is great enough to overcome the force of compression spring 34. The pellets withdraw out of detents 44 and into housing 30 thereby causing the pin engagement assembly to be pulled toward the clutch housing assembly 16 by extension springs 40. The engagement pins 38 engage with elongated holes 42 and positive drive is obtained between the drive shaft 2 and the driven shaft 21.

Upon completion of the vehicle's mission, the clutch must be manually reset by pulling the pin engagement assembly 30 back to its original position with pellets 32 disposed within detent 44.

Figure 2:
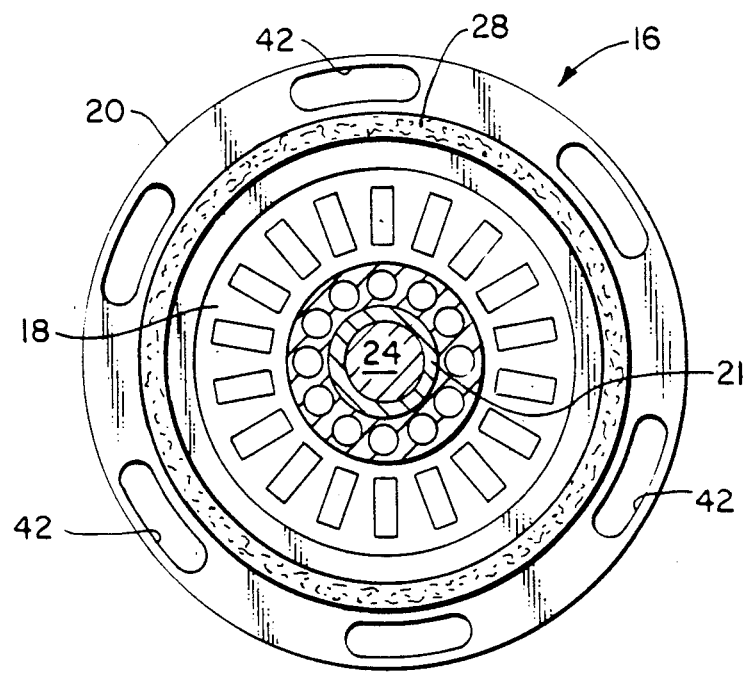
FIG. 2 is a transverse sectional view of the clutch housing of the present invention.

Referring now to FIG. 2, clutch housing assembly 16 includes clutch housing 20, elongated holes 42, clutch material 28, thrust bearing 18, overrunning clutch 22, driven shaft 21, and alignment pin 24.

Figure 3:
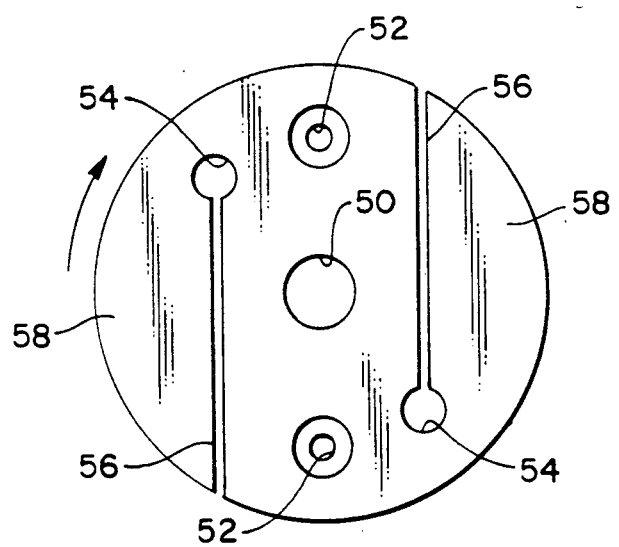
FIG. 3 is a transverse sectional view of the centrifugal clutch of the present invention.

Referring now to FIG. 3, centrifugal clutch 10 includes a center hole 50 and recessed holes 52 (for accepting socket head screws 14). A pair of pivot holes 54 and slots 56 create expansion sections 58 which expand outward as a function of clutch RPM in the direction of rotation shown.

Although the invention has been shown and described with respect to exemplary embodiments thereof, it should be understood by those skilled in the art that the foregoing and various other changes, omissions and additions may be made therein and thereto without departing from the spirit and the scope of the invention.

What is claimed is:

1. A progressive engagement clutch to transfer torque from a drive shaft to a driven shaft comprising:
a clutch hub attached to the end of the drive shaft having a clutch hub section with a detent in it's peripheral surface and a clutch hub plate section;
a cylindrical centrifugal clutch attached to said plate section;
a clutch housing assembly attached to the end of the driven shaft having a clutch housing hub section, a housing section having a cylindrical cavity for receiving said centrifugal clutch, an annular ring of clutch material disposed on the inside radial wall of said housing section for engaging with said centrifugal clutch and an annular face with at least one elongated hole;
a pin engagement assembly having a pellet housing slideably disposed, axially, on said clutch hub with at least one bore extending radially in said pellet housing, a pellet slideably disposed within said bore, push force means for providing a push force on said pellet towards said clutch hub for securing said pellet in said detent, and at least one engagement pin protruding from said pellet housing towards said clutch housing for being received into said elongated hole; and
pull force means for providing a pull force to pull said pin engagement assembly towards said clutch housing when said pellet is withdrawn from said detent;
whereby said pin engagement assembly is fixably held by said pellet being disposed within said detent when the rotational velocity of said drive shaft is low, and as the drive shaft accelerates, centrifugal force causes torque transfer via engagement of said centrifugal clutch with said clutch material until the rotational velocity of the drive shaft is great enough to produce sufficient centrifugal force on said pellet to overcome said push force and displace said pellet out of said detent thereby allowing said pull force means to displace said pin engagement assembly towards said plate section causing said engagement pin to become disposed within said elongated hole to thereby provide torque transfer through said engagement pin to said clutch housing.

2. The progressive engagement clutch of claim 1, further comprising:
an overrunning clutch disposed within said clutch housing hub section for engaging with the driven shaft to allow the drive shaft to impart torque to the driven shaft in only one direction of rotation.

3. The progressive engagement clutch of claim 1, further comprising:
an annular thrust bearing attached to the face of said clutch housing cavity for engaging with said forward face of said centrifugal clutch.

4. The progressive engagement clutch of claim 1, wherein said push force means is comprised of a compression spring.

5. The progressive engagement clutch of claim 1, wherein said pull force means is comprised of an extension spring.

* * * * *